United States Patent
Hall (10) Patent No.: US 9,807,238 B2
(45) Date of Patent: Oct. 31, 2017

(54) SYSTEM AND METHOD FOR GAMIFIED SERVICE REQUEST MANAGEMENT

(71) Applicant: JPMorgan Chase Bank, N.A., New York, NY (US)

(72) Inventor: Richard A. Hall, Marysville, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 127 days.

(21) Appl. No.: 14/793,865

(22) Filed: Jul. 8, 2015

(65) Prior Publication Data
US 2017/0013130 A1    Jan. 12, 2017

(51) Int. Cl.
*H04M 3/523* (2006.01)
*G06Q 30/00* (2012.01)

(52) U.S. Cl.
CPC ........ *H04M 3/5233* (2013.01); *G06Q 30/016* (2013.01); *H04M 2203/408* (2013.01)

(58) Field of Classification Search
None
See application file for complete search history.

(56) References Cited

U.S. PATENT DOCUMENTS

| 7,023,979 | B1* | 4/2006 | Wu | H04M 3/5233 379/265.11 |
| 2011/0202377 | A1* | 8/2011 | Maiya | G06Q 10/06 705/7.11 |
| 2013/0051545 | A1 | 2/2013 | Ross et al. | |
| 2014/0019886 | A1 | 1/2014 | Kannan et al. | |
| 2015/0051957 | A1* | 2/2015 | Griebeler | G06Q 10/06395 705/7.41 |
| 2015/0269586 | A1* | 9/2015 | Garia | G06Q 30/016 705/304 |

OTHER PUBLICATIONS

International Search Report dated Oct. 5, 2016.

* cited by examiner

*Primary Examiner* — Harry S Hong
(74) *Attorney, Agent, or Firm* — Goodwin Procter LLP (57) ABSTRACT

A computing system and method for request management receive an incoming customer request at a request management server. Components at the server identify a type of problem associated with the request and the customer sending the request. The system searches for a customer experience profile for the identified customer in a customer database stored in a computer memory and determines based on the customer experience profile if the customer has prior experience solving the type of problem identified. The system routes the customer to an abbreviated resolution process when the customer has prior experience solving the identified type of problem and resolves the request using the abbreviated resolution process.

30 Claims, 9 Drawing Sheets

SYSTEM AND METHOD FOR GAMIFIED SERVICE REQUEST MANAGEMENT

TECHNICAL FIELD

Embodiments of the invention are related generally to systems and methods for handling incoming service requests, particularly in the context of service requests made to a help desk, such as an information technology support help desk.

BACKGROUND OF THE INVENTION

As technology has evolved, organizations have invested in Voice Over Internet Protocol (VOIP) software for incorporation in their request handling infrastructures to manage the handling of technology service requests. Typically, the software operates upon receipt of an incoming service request to determine the nature of the problem and route the request to an appropriate resolution based on the nature of the problem. Frequently, individual desktop, laptop, and mobile device users encounter technology problems they are unable to independently solve. These individuals may be employees of an organization responsible for the maintenance of the devices. Alternatively, the individuals may be purchasers of the devices or purchasers of software running on the devices. Thus, in the event that a software or hardware problem occurs, the individuals may seek help from an employer responsible for the maintenance of the problematic hardware or software, a manufacturer of the hardware or software product, the distributor of the product, or other entity responsible for resolving problems associated with the user system or software.

The request management systems typically utilize the VOIP software to ask the requestors a series of questions. Based on the answer to each question, the software may generate a response and provide a recommendation. Additionally, when no recommendation can be generated or when the recommendation fails to solve the problem, the software may enable redirection of the request to information technology personnel for resolution.

With most request management systems, all users are treated equally when making requests, particularly when calling the information technology help desk within an organization. This type of handling ensures consistent routing of calls and scripted troubleshooting based upon known or common problems. While this type of system is efficient for handling requests from some callers, some members of the calling population are technically astute and have researched the problem extensively prior to calling. For example, the callers may have found and tried the known solution but continue to encounter issues. These educated callers must also follow the design routing and scripted questions even though they may have already completed this process on their own. The knowledge and experience of these educated callers is discounted by the process.

Thus, when highly educated or skilled callers attempt to use the system, the process in those cases is inefficient as the calls are not routed to appropriate support personnel and resolution is delayed. Thus, in order to resolve a problem, existing software has an inefficient cycle that requires excessive interaction in many cases. Additionally, when capable users become frustrated with answering repetitive questions, they discouraged from utilizing a corporate information technology help desk and may turn instead to risky, unapproved solutions. Use of these alternative resolution techniques could create additional problems and delay resolution of the original problem Accordingly, a system is needed that expedites handling of requests in order to increase the operating speed of a request management system. Optimally, the system may generate particular processing sequences based on the characteristics of system users. The system should be capable of evaluating user expertise in order to appropriately route users based on existing knowledge in order to minimize repetition and expedite resolution.

SUMMARY OF THE INVENTION

In one aspect of the invention, a request management method is provided for managing incoming requests from customers using a request management computing system in order to expedite request resolution. The method includes receiving an incoming customer request from a customer at a request management server and using at least one computer processor of the request management server to perform multiple steps. The steps include identifying the customer sending the request, searching for a customer experience profile for the identified customer in a customer database stored in a computer memory, and determining a customer experience level based on the customer experience profile. The method additionally includes routing the customer to an appropriate resolution process for the identified experience level and resolving the request using the appropriate resolution process at an agent system.

In a further aspect of the invention, a request management computing system is provided for managing incoming requests from customers in order to expedite request resolution. The request management computing system includes at least one computer memory storing customer experience profiles a request management server. The request management server includes a request processing engine, the request processing engine receiving an incoming customer request, identifying the customer sending the request, searching for a customer experience profile for the identified customer in a customer database stored in the computer memory, and determining based on the customer experience profile an experience level of the customer. The system additionally includes a request router, the request router selecting a resolution process appropriate to the customer experience level and routing the request to an agent system, the agent system receiving the request and generating the resolution process appropriate to the customer experience level, thereby resolving the request for the requesting customer.

In another aspect of the invention, a request management computing system is provided for managing incoming requests from customers in order to expedite request resolution. The request management computing system includes a request management server. The server hosts a request processing engine that receives an incoming customer request, analyzes the request to identify a type of problem and identifies the customer sending the request. The request processing engine searches for a customer experience profile for the identified customer in a customer database stored in a computer memory and determines based on the customer experience profile if the customer has prior experience solving the type of problem identified. The server also hosts a request router that selects an abbreviated resolution process when the customer has prior experience solving the identified type of problem. The request router routes the request to an agent system that generates the abbreviated resolution process, thereby resolving the request for the requesting customer.

In an additional aspect of the invention, a corresponding computer-implemented method is provided for managing incoming requests from customers using a request management computing system in order to expedite request resolution. The method includes receiving an incoming customer request from a customer at a request management server of the request management resolution computing system and using at least one computer processor of the request management server to perform multiple steps. The steps include identifying a customer sending the request and identifying a type of problem associated with the request. The steps additionally include searching for a customer experience profile for the identified customer in a customer database stored in a computer memory and determining based on the customer experience profile if the customer has prior experience solving the type of problem identified. The steps additionally include selecting for the customer to an abbreviated resolution process when the customer has prior experience solving the identified type of problem and resolving the request using the abbreviated resolution process.

In embodiments of the invention, the request management computing system implements a testing system for testing and scoring customer expertise. Upon making a request, a customer may be scored and the score may be incorporated in the customer experience record.

BRIEF DESCRIPTION OF THE DRAWINGS

The purpose and advantages of the present invention will be apparent to those of skill in the art from the description in conjunction with the appended drawings.

DESCRIPTION OF THE INVENTION

Embodiments of the invention are related generally to systems and methods for managing requests, particularly information technology (IT) requests made through a VOIP system. For example, the system may operate to address IT requests made from employees of an organization. The proposed system has an increased throughput and processing speed as it is able to more quickly and efficiently resolve user requests. The system is able to assess a level of expertise of a user and the nature of the request and determine an appropriate script for assisting the user based on these factors. Additionally, the system may calibrate agent expertise with particular scripts and select an agent system for routing based on this determination.

Figure 1A:
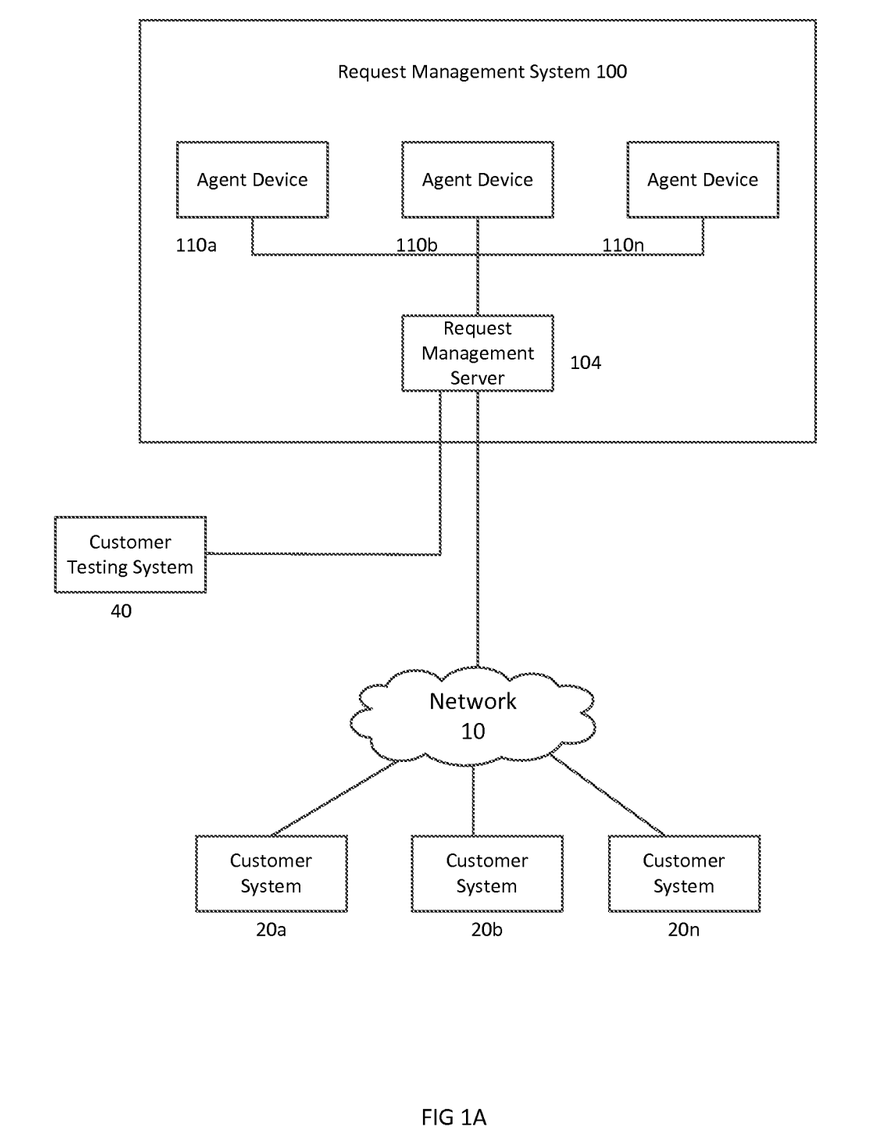
FIG. 1A is a block diagram illustrating an environment for a request management computing system in accordance with an embodiment of the invention.

FIG. 1A is a block diagram illustrating an environment for a request management computing system 100 in accordance with an embodiment of the invention. The request management computing system 100 may include a request management server 104 connected with multiple agent devices 110a . . . 110b. The request management system may also include or be connected with a customer testing system 40. The request management system 100 communicates over a network 10 with customer systems 20a . . . 20n.

The customer systems 20a . . . 20c may be computing devices used by individuals for various purposes. In embodiments of the invention, each customer system may include multiple devices, such as a desktop computer, laptop computer, smart phone and or landline telephone. The customer systems 20 . . . 20c may also include laptop, or portable computing devices such as iPhones, iPads, or Android smart phones.

The customer testing system 40 may communicate with the request management computing system 100 over a network or may be incorporated in the request management computing system 100. The customer testing system 40 may operate independently to test customer expertise on various topics, such as for example, various computing application such as Microsoft Outlook, PowerPoint, Word, Excel, or other applications. The customer testing system may generate a "level" for each customer designated by a number, for example from one to ten, to indicate a level of expertise, or alternatively an identifier, such as "gold", "silver", or "bronze". Levels may be attributed to each customer for individual topics and also as an overall indicator of customer experience with respect to all topics. While the customer testing system 40 may operate independently of the request management computing system 100, it receives feedback from the request management system 100 for each customer when a request is made. Thus, a customer level can change by virtue of the results of a submitted request. The customer testing system 40 may alternatively be integrated with the request management computing system 100. The customer testing system 40 is further described below with reference to FIG. 3.

The request management computing system 100 is shown as including a request management server 104 as well as multiple agent devices 110a . . . 110n. The request management server 104 may, in embodiments of the invention, include VOIP software for handling received requests through the use of a processor. The request management server 104 is further described below with reference to FIG. 2.

The agent devices 110a . . . 110b may include any type of computing device such as a desktop computer, laptop computer, smart phone and or landline telephone. The agent devices 110a . . . 110n may also include laptop, or portable computing devices such as iPhones, iPads, or Android smart phones. The agent devices 110a . . . 110n receive instructions routed from the request management server 104 and ultimately serve to generate the resolution script and operate in conjunction with customer systems to reach a resolution.

The network 10 is preferably the Internet, but may be or include other types of networks. The network 10 may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Additional external systems and sources (not shown) may also be included and may be connected over the network 10 with the request management computing system 100. External systems and sources may include, for example, testing resources and alternative sources of customer information. These are merely examples, as the scope of the external systems and sources is generally unlimited.

Figure 1B:
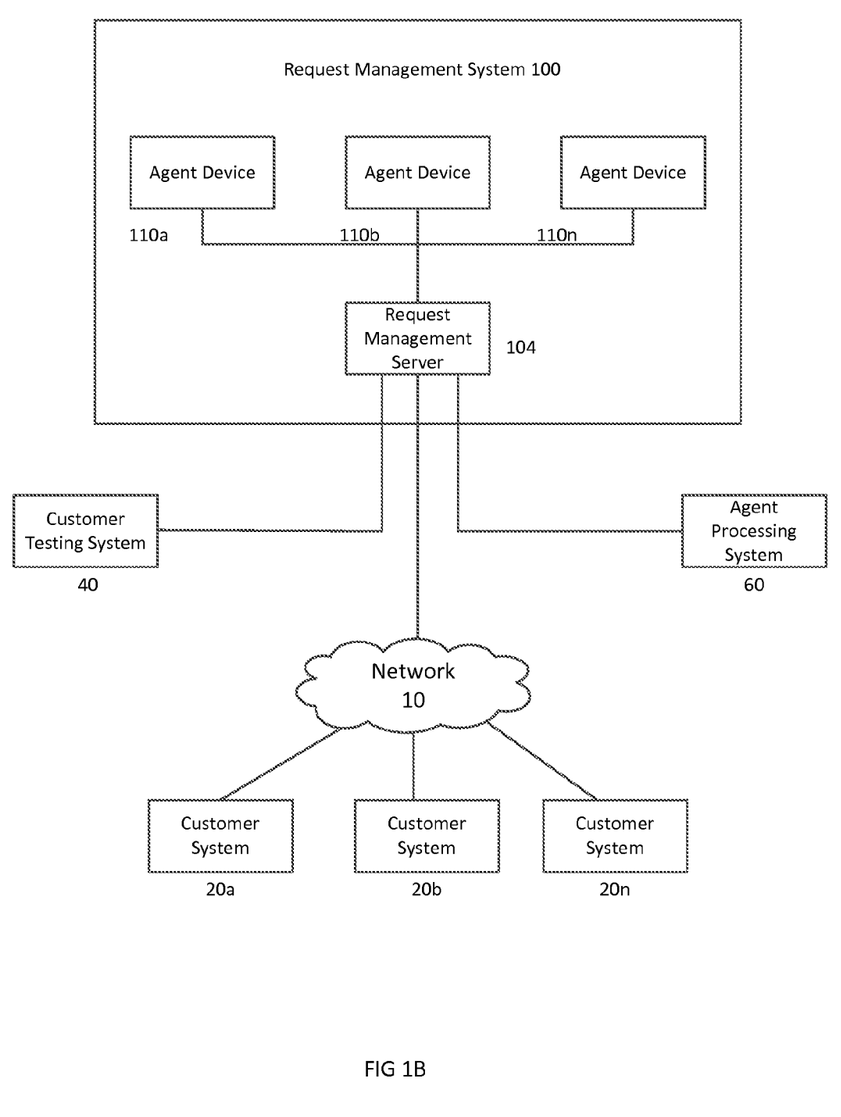
FIG. 1B is a block diagram illustrating an environment for operating a request management computing system in accordance with an additional embodiment of the invention.

FIG. 1B is a block diagram illustrating an environment for operating a request management computing system 100 in accordance with an additional embodiment of the invention. FIG. 1B shows a similar system to FIG. 1A including the request management computing system 100, agent devices 110*a* . . . 110*n*, request management server 104, customer testing system 40, network 10, and the customer systems 20*a* . . . 20*n*. FIG. 1B also shows an agent processing system 60. In embodiments of the invention, both the skills of the customer and the skills of the processing agents are evaluated. Agents may have areas of expertise and may receive an elevated ranking for those areas of expertise. Thus, in accordance with the displayed embodiment of the invention, when routing is performed, the request management computing system 100 considers both the customer experience level and the agent experience level, either generally, with respect to a particular problem, or both generally and with respect to a particular problem. The agent processing system 60 is described in greater detail with reference to FIG. 4.

Figure 2:
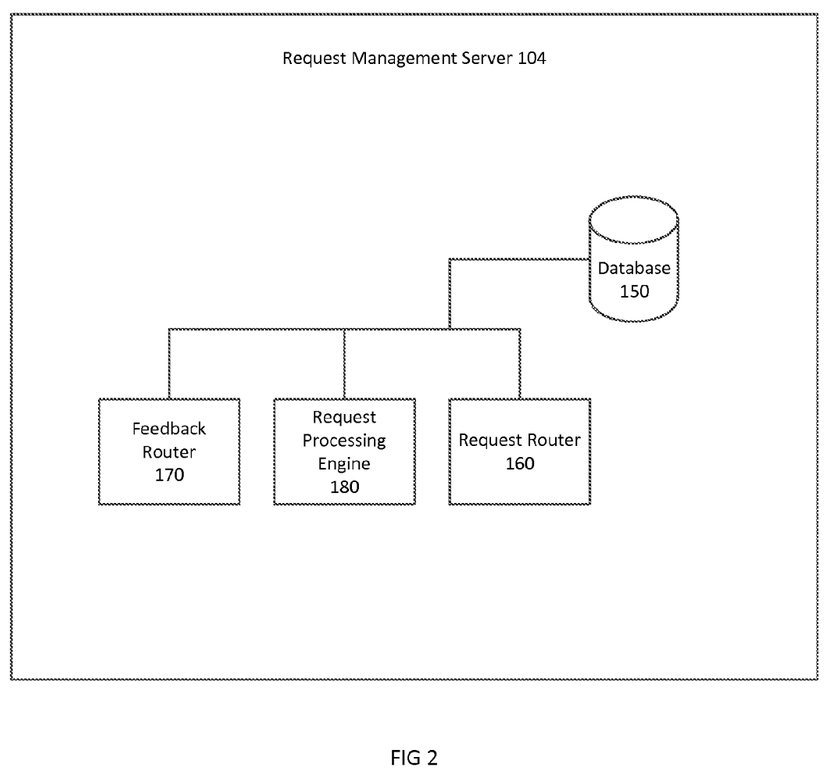
FIG. 2 is a block diagram illustrating a request management server in accordance with an embodiment of the invention.

FIG. 2 is a block diagram illustrating a request management server 104 in accordance with an embodiment of the invention. The request management server 104 may include both hardware and software components including a database 150 stored in a computer memory, a request processing engine 180, a request router 160, and a feedback router 170.

The database 150 may be stored in a computer memory and may store data, information, algorithms, rules, and any other information useful to the functioning of the request management computing system. For example, the database 150 may store a matrix showing how an experience level of a customer correlates with a request handling script. For example, a customer with a silver experience level in system login issues may correlate with a particular script number. Accordingly, the request processing engine 180 of the request management server 104 is able to access the database 150 to determine an appropriate script. Additionally, the database 150 may store a matrix illustrating how an agent experience level corresponds to a particular selected request handling script and may include a list of available agents having the appropriate experience level. The request router 160 may utilize this matrix in the database 150 to route requests with instructions for processing. The database 150 may also store information pertaining to agent availability and routing and processing algorithms for handling requests.

The request processing engine 180 may interact with the customer systems to receive requests and process the requests by identifying the customer, consulting a database for customer information to determine a level of customer experience, and identifying the problem that is the subject of the request. The customer information database may be included in the testing system as described below or may alternatively be included in the illustrated database 150. The request processing engine 180 may deliver the information it acquires to the request router 160. The request router 160 may utilize routing logic by considering the problem and the experience level of the customer either generally or with respect to the particular problem to determine an appropriate script for execution. Once the request router 160 determines the appropriate script for resolution, it may consult the database 150 or a separate agent database to determine an agent level of experience with respect to the selected script. The request router 160 then routes the request to a selected agent with a sufficient experience level. The request router 160 may also check for agent availability when making a routing decision. Upon resolution, the agent device may forward a transcript of the request resolution to the feedback router 170. The feedback router 170 then updates the customer database, the agent database, and the database 150 accordingly to reflect any changes in experience level. While all of the information may be contained within database 150, the customer information and agent information may additionally or alternatively be housed in separate databases.

Figure 3:
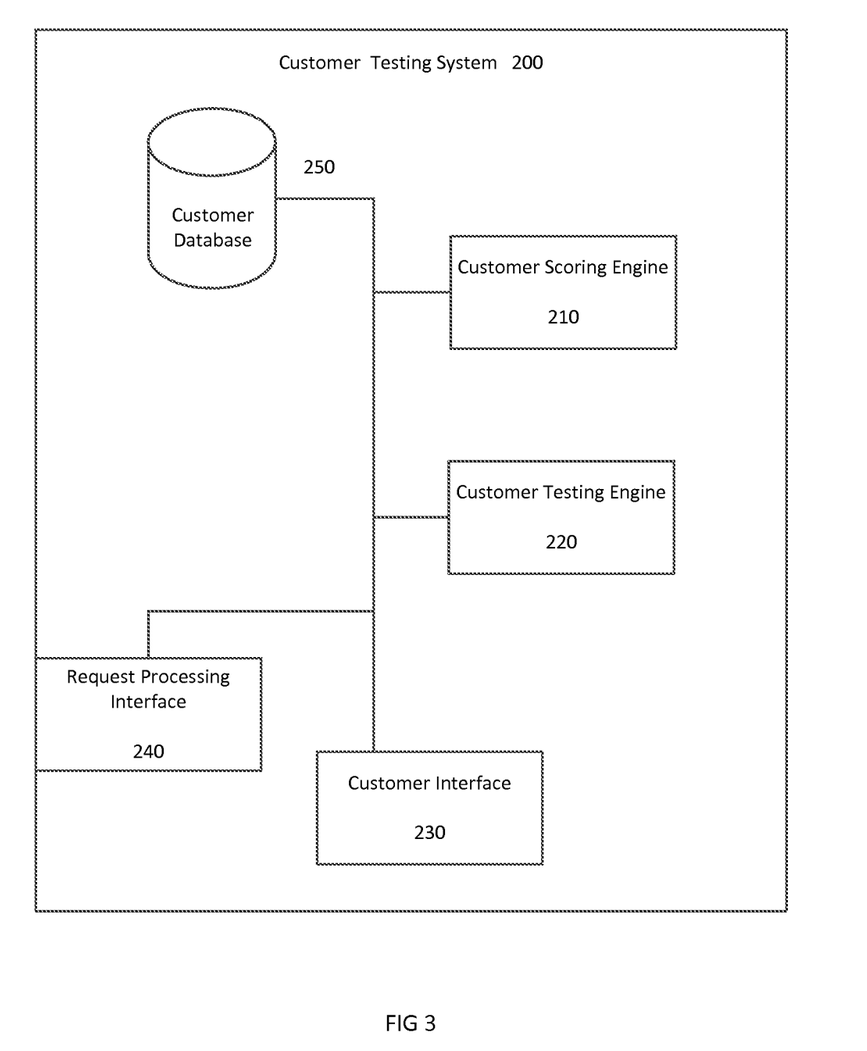
FIG. 3 is a block diagram illustrating a customer testing system for operation with the request management computing system in accordance with an embodiment of the invention.

FIG. 3 is a block diagram illustrating a customer testing system 200 for operation with the request management computing system in accordance with an embodiment of the invention. While the customer testing system 200 is shown as a separate system communicating with the request management computing system, it may alternatively be integrated with the request management computing system. The customer testing system 200 may include a request processing interface 240, a customer interface 230, a customer testing engine 220, a customer scoring engine 210 and a customer database 250.

The customer database 250 may be stored in a computer memory. The customer database 250 identifies each customer with an identifier such as a standard ID and correlates each standard ID with a customer experience level for identified types of problems and optionally, an overall experience level. By default, all customers may be assigned a basic status. For example, all system users may be assigned a "bronze" status and initially the database reflects the bronze customer experience status for all customers. Upon completion of customer testing, the level in the database would be updated for example to silver or gold. Customers with a bronze level would be routed to a standard default request resolution status when submitting a request. Customers with gold or silver status would be entitled to an abbreviated process.

The request processing interface 240 is capable of interacting with the request management server to receive requests for data from the customer database and return the requested data. In embodiments of the invention, when a request is received, the request management server captures data stored in the customer database 250 by connecting with the request processing interface.

The customer interface 230 allows the customer systems to connect with the customer testing system 100. The interface 230 may be one or more types of interfaces that allow communication between various devices over a variety of networks. The customer may connect with the customer testing system 200 in order to implement testing procedures and build a record in the customer database 250. The customer may for example, connect with the customer testing system 200 by accessing a URL to cause the customer interface 230 to generate testing procedures for display on a monitor.

The customer testing engine 220 may generate a series of questions to present through the customer interface 230 to the customer system. The customer may answer a series of questions that may include substantive questions and biographical questions. For example, the customer testing engine 220 may generate questions regarding job title and years of experience in a particular position. The customer testing engine 220 may also ask the customer to perform a series of tasks, such as performing an outlook search or changing display parameters. The testing engine 220 may also provide an educational script and subsequently test the customer regarding the contents of this script.

The customer scoring engine 210 scores the customer based on the results of customer testing. The customer scoring engine 210 further may access historical scores for the customer in the customer database 250 and update the historical scores by adding the new score. Optionally, the customer scoring engine 210 may average all scores or create a weighted average with the more recent scores having additional weight. As set forth above, the customer scoring engine 210 may evaluate customers for expertise in specific areas and/or for overall expertise. The customer scoring engine 210 may assign a level indicator, such as platinum, gold, silver, or bronze or a numerical score based on a scale of 1 to 100, 1 to 10, or any other scale. The customer scoring engine 210 may communicate the updated score to the customer through the customer interface 230 and update the database 250 with the newly calculated score or level.

Figure 4:
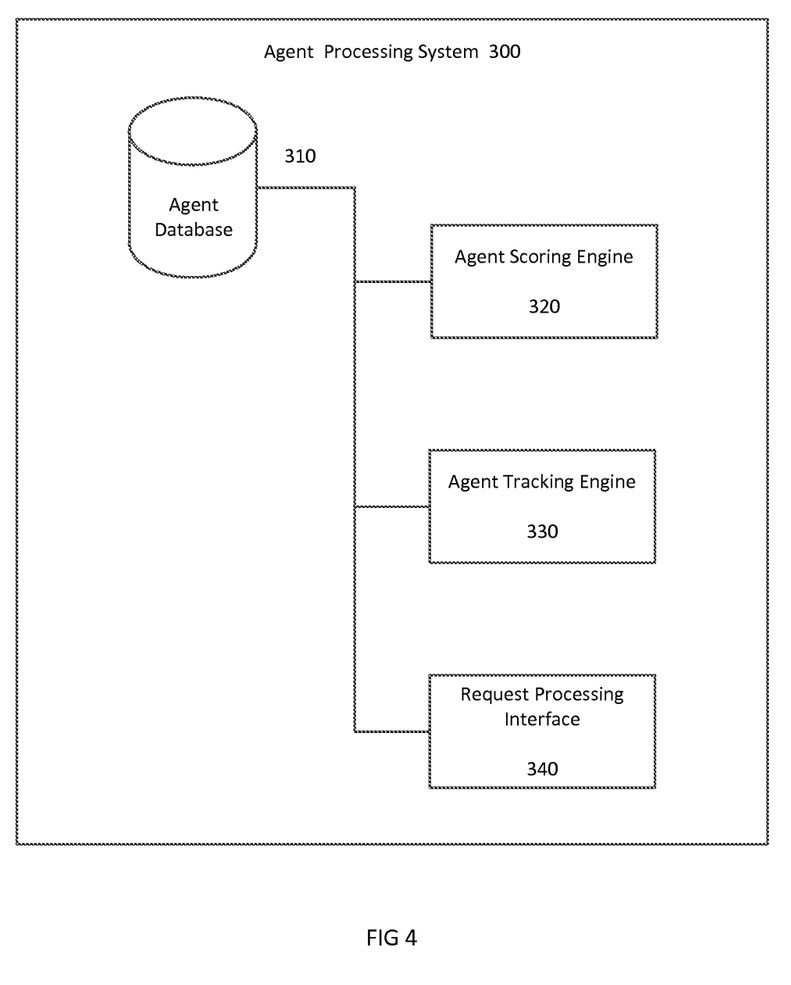
FIG. 4 is a block diagram illustrating an agent processing system for operation with the request management computing system in accordance with an embodiment of the invention.

FIG. 4 is a block diagram illustrating an agent processing system 300 for operation with the request management computing system in accordance with an embodiment of the invention. The agent processing system 300 includes an agent database 310, an agent scoring engine 320, an agent tracking engine 330 and a request processing interface 340.

The agent database 310 includes stored records pertaining to agents operating within the request management environment. The agents may include, for example, IT help desk personnel. Various agents may have expertise with specific types of applications and problems. The agent processing system 300 seeks to identify this expertise and record it in the agent database 310.

The request processing interface 340 may interact with the request management server, and specifically the routing engine of the request management server. Thus the request processing interface may select an appropriate agent for addressing any given request based on the nature of the problem and the expertise of the agent. The request processing interface 340 may receive the request information and consult the agent database 310 for agent experience profiles. Based on the agent experience profile, the request processing interface may make one or more agent recommendations to the routing engine of the request management server.

The agent tracking engine 330 may track agent interaction with requestors in order to update agent expertise. Accordingly, the agent tracking engine 330 receives information from the request processing interface to assess agent interactions.

The agent scoring engine 320 can then score the agent with respect to the particular request topic. Accordingly, all agents may have a level of expertise with respect to each defined topic that can be addressed by the request management system. The agent scoring engine 320 may update agent ratings in the agent database 310. In embodiments of the invention, agents may be rated based on a count of the number of times the agent has addressed a particular topic. Alternatively, agents may be rated based on their satisfactory resolution of requests related to a particular topic. Agents may also be rated based on the speed of resolution. Agent ratings may alternatively be based on a combination of these factors.

The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Figure 5:
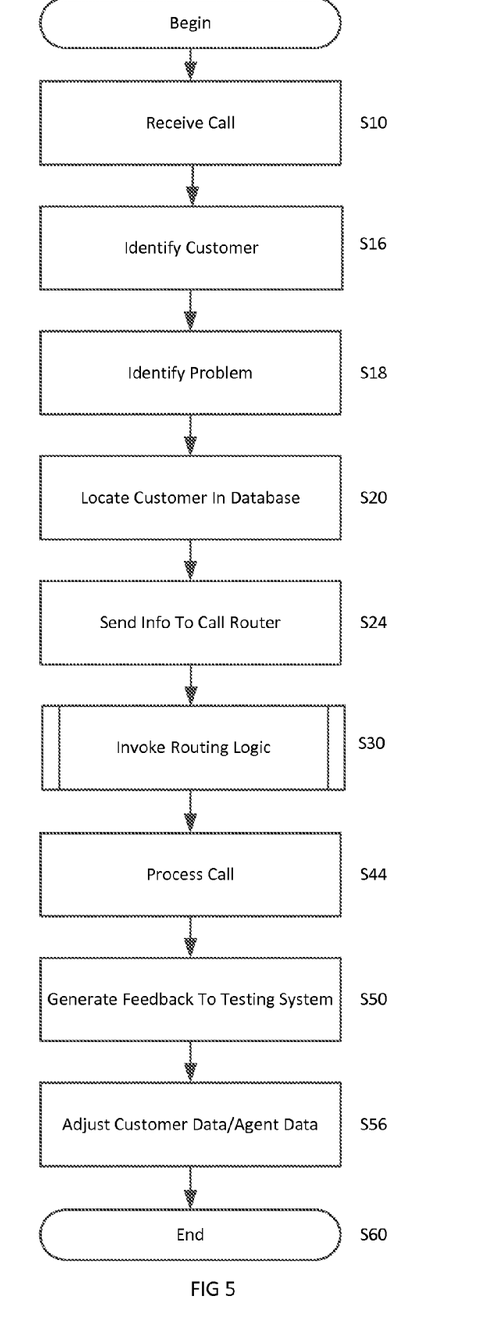
FIG. 5 is a flow chart illustrating request handling in accordance with an embodiment of the invention.
Figure 6:
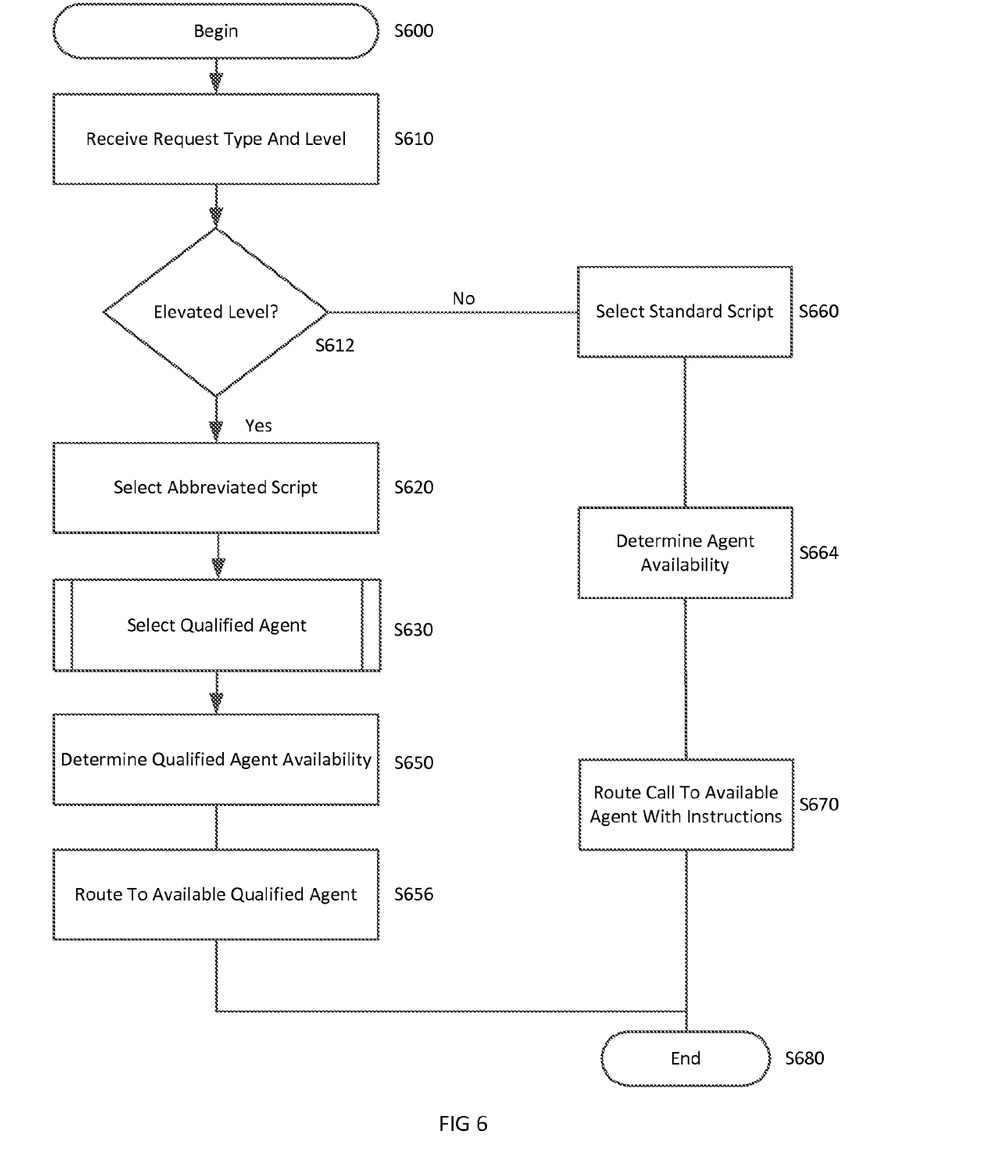
FIG. 6 is a flow chart illustrating implementation of routing logic in accordance with an embodiment of the invention.

FIG. 5 is a flow chart illustrating request handling in accordance with an embodiment of the invention. The process begins when a request is received in S10. In the illustrated embodiment, the request is in the form of a call. The customer is identified in S16 by the request management system. In the illustrated embodiment, the request management system identifies the topic of the request or problem in S18. In S20, the request management system seeks to locate the customer in a database. The database may be the database 150 shown in FIG. 2 or the customer database 250 shown in FIG. 3. As explained above, the database may either be incorporated in or accessible to the request management system. The request management system retrieves the caller ranking or level from the database. The database may store multiple rating or levels in a matrix, correlating them with various types of problems typically resolved through the request management system. Thus, the request processing engine sends the customer experience rating or level with respect to the particular topic to the routing engine in S24. In other embodiments, each customer may receive only an overall customer experience rating or level and this level is conveyed to the call routing engine in S24. In S30, the call routing engine invokes routing logic to route the request to an appropriate agent. Sample routing logic is illustrated in FIG. 6 below. After routing logic operates, the request management system processes the call in S44 and generates feedback to the testing systems in S50. The system then adjusts customer data and agent data within the appropriate databases.

FIG. 6 is a flow chart illustrating implementation of routing logic in accordance with an embodiment of the invention. The routing logic begins in S600 and receives an identification of the request type and customer experience level in S610. In S612, the routing engine determines if the customer has an elevated experience level such that an abbreviated script would likely lead to rapid resolution of the request.

If the routing engine determines that the customer does not have an elevated experience level in S612, the system selects a standard script in S660. Upon selection of the standard script in S660, the routing engine determines agent availability in S664 and routes the request to an available agent with instructions to execute a particular script to resolve the particular problem in S670.

If the routing engine determines in S612 that the customer does have an elevated experience level, the routing engine selects an appropriate abbreviated script in S620. The script may be selected from multiple scripts related to the topic that may be stored in the database of the request management system. In embodiments of the invention, the database of the request management systems stores one standard script per topic and multiple abbreviated scripts that can be selected based on the particular customer experience level. In S630, the system selects a qualified agent for resolution of the request. The process of selecting a qualified agent is further described below with respect to FIG. 8. In S650, the routing engine assesses qualified agent availability and in S656, the routing engine routes the request to a selected available and qualified agent. The selection of a qualified agent may be omitted in embodiments of the invention and the system may opt instead to select a first available agent.

Figure 7:
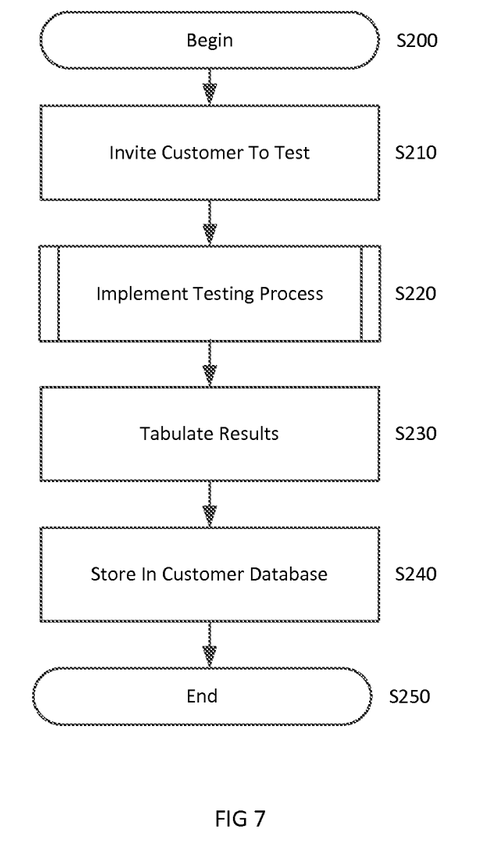
FIG. 7 is a flow chart illustrating a testing process in accordance with an embodiment of the invention.

FIG. 7 is a flow chart illustrating a testing process in accordance with an embodiment of the invention. The process begins in S200 and the system invites the customer to test in S210. The testing process is implemented in order to make an initial assessment of customer experience level and can be used to update customer experience levels over time.

The testing process can be implemented separately from the request resolution process. For example, an organization can generate electronic mail messages providing employees with a link for testing. If the employees elect to take the tests, their customer experience profile will be updated in accordance with their results. Thus, the employees may have an elevated experience level upon making their next resolution request.

Alternatively, the testing process can be implemented in combination with request resolution. For example, upon receiving a request, the request management system can generate test questions. In embodiments of the invention, requesting customers may have the option to answer the test questions or to skip the test questions. If the requesting customers answer the test questions, their customer experience level may be elevated in real time in accordance with their answers.

In S220, the system implements a testing process. The testing process may require testers to follow a series of instructions or answer a series of questions. The tests may be timed so that testers attempt to answer as many questions or complete as many steps as they can within the prescribed time period. The experience level of the customer could then be evaluated based on how many steps they completed in the time period. Alternatively, the test may not be timed and instead, employees can answer questions or complete steps as required to move up to the next level. The test may be terminated when the employee is unable to complete a step or answer a question, or alternatively when the employee has more than a predetermined number of wrong answers or failed attempts to complete a step. Employees can return to take the tests again to advance to the next level.

In S230, the customer scoring engine tabulates results. The customer scoring engine may tabulate the results of the current test and use these results to update previously stored customer experience level data in S240. The process ends in S250.

Figure 8:
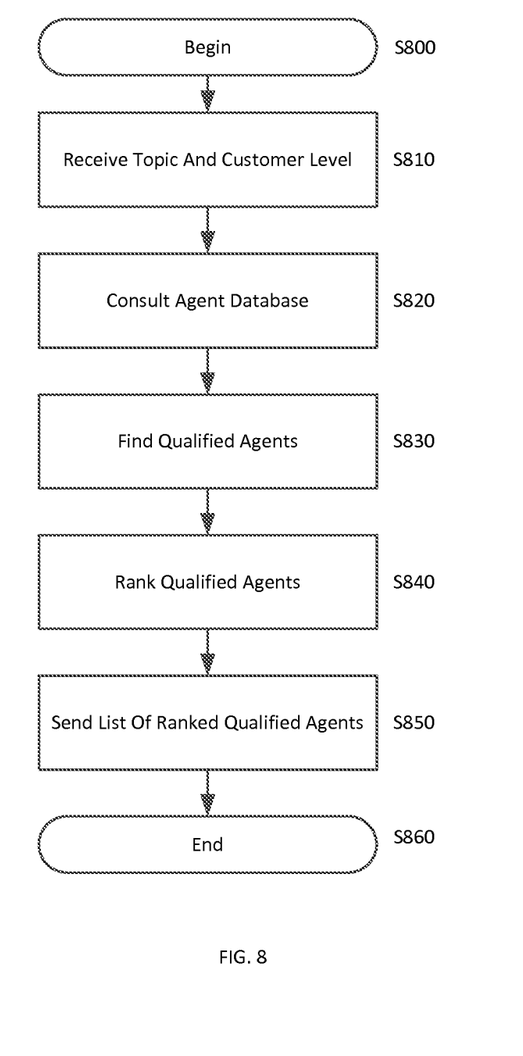
FIG. 8 is a flow chart illustrating a process for selecting qualified agents in accordance with embodiments of the invention.

FIG. 8 is a flowchart illustrating the agent selection process of FIG. 6. The process begins in S800 and the agent processing system receives the topic of the request and customer experience level in S810. In S820, the agent processing system consults the agent database to determine agent expertise with respect to the received topic. In S830, the agent processing system finds qualified agents based on the topic and the level of customer experience. As set forth above, the database may store a matrix showing all agents, and all topics and customer experience levels that the agents are equipped to handle. In 5840, the system may rank qualified agents to simplify the selection of available qualified agents. In 5850, the agent processing system may send the list of ranked qualified agents to the routing engine. The routing engine then assesses availability and may route the request to the most highly ranked available and qualified agent.

Thus, through the use of abbreviated resolution processes for multiple customers who have reached an elevated customer experience level, the speed of request processing by the request management computing system is increased and the request management computing system is able to handle an increased volume of requests. Although examples describe a VOIP help desk request management system, the system could be customized to accommodate request management systems for any industry and could be tailored to accommodate both internal and external customers. Furthermore, in addition to improved efficiency, the system of the invention significantly improves the customer experience.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A request management computing system for managing incoming requests from customers in order to expedite request resolution, the request management computing system comprising:
    at least one computer memory storing customer experience profiles;
    a request management server including:
        a request processing engine, the request processing engine receiving an incoming customer request, identifying the customer sending the request; searching for a customer experience profile for the identified customer in a customer database stored in the computer memory; determining based on the customer experience profile an experience level of the customer, the experience level selected from one of multiple pre-defined levels; and
        a request router, the request router selecting a resolution process from multiple available resolution processes, each resolution process corresponding to one of the pre-defined levels, wherein the selected resolution process is appropriate to the experience level and routing the customer request to an agent system; and
    the agent system receiving the customer request and executing the resolution process appropriate to the experience level, thereby resolving the customer request for the requesting customer.

2. The system of claim 1, further comprising a customer testing system including a customer testing engine and a customer scoring engine for evaluating the experience level of the customer based on results generated by the customer testing engine.

3. The system of claim 2, wherein the customer testing system is activated upon receipt of a request by the request management system.

4. The system of claim 2, wherein the customer testing system tests the customer independently of receipt of customer requests.

5. The system of claim 2, further comprising an agent processing system including an agent tracking engine for tracking agent resolution activities and an agent scoring engine for scoring agent expertise based on the agent resolution activities.

6. The system of claim 1, wherein the request management server includes a feedback router for implementing testing results to update the customer experience profiles.

7. The system of claim 1, wherein the request management server further determines a topic of the request and searches the customer experience profile for a customer experience level with respect to the particular topic.

8. The system of claim 1, wherein the request management server selects a resolution process based on the topic and the customer experience with respect to the topic.

9. The system of claim 8, wherein the request router selects an available and qualified agent and routes the request with the selected resolution process and instructions to the available and qualified agent.

10. The system of claim 1, wherein when the customer has an elevated experience level, the request management server selects an abbreviated resolution process for resolution of the request.

11. A request management method for managing incoming requests from customers using a request management computing system in order to expedite request resolution, the method comprising:
    receiving an incoming customer request from a customer at a request management server of the request management resolution computing system;
    using at least one computer processor of the request management server to perform steps including:
        identifying the customer sending the request;
        searching for a customer experience profile for the identified customer in a customer database stored in a computer memory;
        determining based on the customer experience profile an experience level of the customer, the experience level selected from one of multiple pre-defined experience levels;
        routing the customer to an appropriate resolution process from multiple available resolution processes, each resolution process corresponding to one of the pre-defined levels, wherein the selected resolution process is appropriate for the identified experience level; and
        resolving the request using the appropriate resolution process.

12. The method of claim 11, further comprising evaluating an experience level of the customer using a customer testing system including a customer testing engine and a customer scoring engine for evaluating the results generated by the customer testing engine.

13. The method of claim 12, wherein the customer testing system is activated upon receipt of a request by the request management system.

14. The method of claim 12, wherein the customer testing system tests the customer independently of receipt of customer requests.

15. The method of claim 12, further comprising tracking agent resolution activities using an agent tracking engine and scoring agent expertise using an agent scoring engine based on the agent resolution activities.

16. The method of claim 11, further comprising using a feedback router for implementing testing results to update the customer experience profiles.

17. The method of claim 11, further comprising determining a topic of the request and searching the customer experience profile for a customer experience level with respect to the particular topic.

18. The method of claim 11, wherein the request management server selects a resolution process based on the topic and the customer experience with respect to the topic.

19. The method of claim 18, wherein the request router selects an available and qualified agent and routes the request with the selected resolution process and instructions to the available and qualified agent.

20. The method of claim 11, wherein when the customer has an elevated experience level, the request management server selects an abbreviated resolution process for resolution of the request.

21. A request management method for managing incoming requests from customers using a request management computing system in order to expedite request resolution, the method comprising:
receiving an incoming customer request from a customer at a request management server of the request management resolution computing system;
using at least one computer processor of the request management server to perform steps including:
identifying a type of problem associated with the request identifying the customer sending the request;
searching for a customer experience profile for the identified customer in a customer database stored in a computer memory;
determining based on the customer experience profile if the customer has prior experience solving the type of problem identified, and identifying an experience level for the type of problem, the experience level selected from one of multiple pre-defined experience levels;
routing the customer to an abbreviated resolution process selected from multiple available resolution processes, each resolution process corresponding to one of the pre-defined experience levels, wherein the selected abbreviated resolution process is appropriate to the customer experience level when the customer has prior experience solving the identified type of problem; and
resolving the request using the abbreviated resolution process.

22. The method of claim 21, further comprising evaluating an experience level of the customer using a customer testing system including a customer testing engine and a customer scoring engine for evaluating the results generated by the customer testing engine.

23. The method of claim 22, wherein the customer testing system is activated upon receipt of a request by the request management system.

24. The method of claim 22, wherein the customer testing system tests the customer independently of receipt of customer requests.

25. The method of claim 21, further comprising using a feedback router for implementing testing results to update the customer experience profiles.

26. A request management computing system for managing incoming requests from customers in order to expedite request resolution, the request management computing system comprising:
a request management server including:
a request processing engine, the request processing engine receiving an incoming customer request, analyzing the request to identify a type of problem, identifying the customer sending the request; searching for a customer experience profile for the identified customer in a customer database stored in a computer memory;
determining based on the customer experience profile if the customer has prior experience solving the type of problem identified, and identifying an experience level of the customer for the type of problem, the experience level selected from one of multiple pre-defined experience levels; and
a request router, the request router selecting for the customer an abbreviated resolution process selected from multiple available resolution processes, each resolution process corresponding to one of the pre-defined experience levels, wherein the selected abbreviated resolution process is appropriate to the customer experience level when the customer has prior experience solving the identified type of problem and routing the customer to an agent system; and
the agent system receiving the request and executing the abbreviated resolution process, thereby resolving the request for the requesting customer.

27. The system of claim 26, further comprising a customer testing system including a customer testing engine and a customer scoring engine for evaluating the experience level of the customer based on results generated by the customer testing engine.

28. The system of claim 27, wherein the customer testing system is activated upon receipt of a request by the request management system.

29. The system of claim 27, wherein the customer testing system tests the customer independently of receipt of customer requests.

30. The system of claim 26, wherein the request management server includes a feedback router for implementing testing results to update the customer experience profiles.

* * * * *